United States Patent
Liu et al.

(10) Patent No.: US 8,247,349 B2
(45) Date of Patent: Aug. 21, 2012

(54) ENHANCED ABSCISIC ACID ANALOG AND FERTILIZER PERFORMANCE

(75) Inventors: Xiaozhong Liu, Vernon Hills, IL (US); Daniel F. Heiman, Libertyville, IL (US); Derek D. Woolard, Zion, IL (US); Yueh Wang, Arlington Heights, IL (US); Benjamin Belkind, Wilmette, IL (US); Prem Warrior, Green Oaks, IL (US); Gregory D. Venburg, Deerfield, IL (US); Peter D. Petracek, Grayslake, IL (US)

(73) Assignee: Valent BioSciences Corporation, Libertyville, IL (US)

( * ) Notice: Subject to any disclaimer, the term of this patent is extended or adjusted under 35 U.S.C. 154(b) by 424 days.

(21) Appl. No.: 12/011,807

(22) Filed: Jan. 30, 2008

(65) Prior Publication Data

US 2008/0254982 A1     Oct. 16, 2008

Related U.S. Application Data

(60) Provisional application No. 60/898,456, filed on Jan. 31, 2007.

(51) Int. Cl.
*A01N 25/00* (2006.01)
(52) U.S. Cl. .................................................. 504/116.1
(58) Field of Classification Search ................ 504/116.1
See application file for complete search history.

(56) References Cited

U.S. PATENT DOCUMENTS

| 4,581,057 A * | 4/1986 | Nooden | 71/28 |
| 4,943,315 A * | 7/1990 | Schulz et al. | 504/140 |

OTHER PUBLICATIONS

Priest et al. The use of abscisic acid analogues to analyse the substrate selectivity of UGT71B6 a UDP-glycosyltransferase of *Arabidopsis thaliana*. FEBS Letters 579 (2005) 4454-4458.*
Uptake, Movement, Activity, and Persistence of an Abscisic acid Analog (8' Acetylene ABA Methyl Ester) in Marigold and Tomato. Sharma et al. J.Plant Growth Regul. 2005 24:28-35.*
Rose et al., "8l'-acetylene ABA: an irreversible inhibitor of ABA 8'-hydroxylase", Bioorganic & Medicinal Chemistry Letters, 1997, vol. 7, pp. 2543-2546.

* cited by examiner

*Primary Examiner* — Annette Para
(74) *Attorney, Agent, or Firm* — Wood, Phillips, Katz, Clark & Mortimer

(57) ABSTRACT

This invention relates to the use of nitrogen and/or calcium containing fertilizers or salts to improve the performance of abscisic acid (ABA) analogs and ABA derivatives on tomato leaf transpiration inhibition. This invention also relates to the use of ABA analogs or derivates or their salts to reduce the phytotoxicity of foliar applied nitrogen and/or calcium-containing fertilizers or salts.

15 Claims, No Drawings

ENHANCED ABSCISIC ACID ANALOG AND FERTILIZER PERFORMANCE

FIELD OF THE INVENTION

The present invention relates to the use of nitrogen containing fertilizers to improve the performance of abscisic acid (ABA) analogs or ABA derivatives or their salts by increasing the extent or extending the duration of plant leaf transpiration inhibition. The present invention also relates to the use of ABA analogs or ABA derivatives or their salts in conjunction with fertilizers such as nitrogen-containing or calcium-containing fertilizers to reduce their phytotoxicity.

BACKGROUND OF THE INVENTION

Abscisic acid (ABA) is a natural occurring hormone found in all higher plants (Cutler and Krochko 1999, Trends in Plant Science, 4:472-478; Finkelstein and Rock 2002, The *Arabidopsis* Book, ASPB, Monona, Md., 1-52). ABA is involved in many major processes during plant growth and development including dormancy, germination, bud break, flowering, fruit set, general growth and development, stress tolerance, ripening, maturation, organ abscission and senescence. ABA also plays an important role in plant tolerance to environmental stresses, such as drought, cold, and excessive salinity.

One key role of ABA in regulating physiological responses of plants is to act as a signal of reduced water availability to reduce water loss, inhibit growth and induce adaptive responses. All these functions are related to stomatal closure (Raschke and Hedrich 1985, Planta, 163: 105-118). When stomata close, plants conserve water to survive environmental stresses. However, stomatal closure also can result in reduced photosynthesis, respiration and growth. Stomatal closure is a rapid response of plants to ABA. The mechanism of this effect has been studied and has been shown to be primarily due to ABA effects on guard cell ion channels. Specifically, ABA blocks $H^+$ extrusion and $K^+$ influx from guard cells and promotes $K^+$, $Cl^-$, and malate extrusion and $Ca^{2+}$ influx. The net effect of ABA is to reduce the total osmotica in the guard cells, which in turn decreases the water content in the cell. This causes the guard cells to lose turgor and thus close the stomata (Assmann 2004, In: *Plant Hormones Biosynthesis, Signal Transduction, Action*, ed. Davies, p 391-412). The closing of the stomata results in reduced transpiration. The reduction of transpiration caused by stomatal closure is widely used as an experimental technique to indirectly identify and quantify ABA activity. The ability of ABA to reduce water use can not only extend the display shelf life of ornamentals or the postharvest shelf life of leafy plants, or promote drought tolerance, but it also can lead to a reduction in cold stress injury (Aroca et al. 2003, Plant Sci., 165: 671-679). ABA-induced reduction of stomatal conductance can lead to a decrease in photosynthesis (Downton et al. 1988 New Phytol., 108: 263-266) which in turn can lead to growth control. Improving the performance of ABA may be useful not only for improving the reduction of transpiration and water loss, but also for other uses of foliar applied ABA such as maintaining dormancy of buds and seeds, controlling fruit set, accelerating defoliation and enhancing color development of fruit such as grapes.

The exogenous application of ABA is an alternative approach to induce plant response to abiotic stress. However, exogenous ABA entering plant cells can be easily catabolized and, thus the effect of ABA on plants usually lasted a short time.

ABA analogs are chemicals with similar structures as natural ABA. A series of ABA analogs have been developed by the Plant Biology Institute of Canada to mimic ABA function. So far, many ABA analogs have reportedly exhibited ABA-like effects. Compared to natural ABA, ABA analogs are more resistant to degradation. However, the effects of ABA analog treatments varied with the concentration, mode of application (foliar or root-dip) and crop species.

Surfactants or adjuvants have long been used with pesticides and plant growth regulators to increase absorption or uptake by plants and thus improve the performance of the applied chemicals. Adjuvants include wetter-spreaders, stickers, penetrants, compatibility agents and fertilizers. Many adjuvants are currently available and most of them are non-ionic surfactants. However, there is little information about adjuvants suitable for ABA analogs. Tween 20, a popular surfactant used in scientific research, was reported to be added as the surfactant for ABA analogs (Waterer, 2000. ADF Project 97000289). However, Tween 20 is used for academic research and not packaged and distributed for the agricultural market.

Foliar applied nitrogen fertilizers, such as urea or ammonium nitrate, have been used in combination with plant growth regulators (PGRs) to improve the performance of the PGR. For example, the combination of the PGRs benzyladenine (Naito et al. 1974, J. Japan. Soc. Hort. Sci., 43: 215-223) or gibberellic acid (Shulman et al. 1987, Plant Growth Regul., 5: 229-234) with urea increased the grape berry sizing effect compared to the sizing effect achieved with the PGR alone. Ammonium salts have been reported to increase the absorption of pesticides (Wang and Liu 2007, Pestic. Biochem., Physiol., 87: 1-8). Nooden (1986, U.S. Pat. No. 4,581,057) claims the use of ABA analogs to increase fertilizer performance. However, there are no reports on the use of urea ($H_2NCONH_2$) or ammonium nitrate ($NH_4NO_3$) to improve ABA analog performance.

Foliar application of nutrients has been used as an alternative approach to supplement nutrient to crops. Kuepper (2003, Appropriate Technology Transfer for Rural Areas. March 2003) reported that foliar fertilization increased crop yield and quality as well as resistance of crops to biotic and abiotic stress. The major advantage of foliar fertilization over ground fertilization is its efficiency of nutrient absorption. In contrast, root absorption costs energy to transport nutrient from root to shoots. Also, foliar fertilization reduces nutrient loss and ground water contamination.

Foliar applications of nitrogen fertilizer, however, do not always increase the yield of crops as expected. For example, foliar application of urea on soybeans usually decreased the yield (Gray, 1977, Situation 77. Natl. Fertil. Dev. Ctr., Muscle Shoals, Ala. Bull. Y-115). The reduction of soybean yield was thought to be caused by leaf burn due to phytotoxicity of foliar urea fertilization (Krogmeier et al., 1989, Proc. Natl. Acad. Sci. USA. 86:8189-8191). Phytotoxicity of foliar fertilizer was affected by the form of nitrogen fertilizer, concentration of fertilizer and humidity or temperature of application site (Garcia and Hanway, 1976, Agron. J. 68, 653-657; Poole et al., 1983, Agronomy J. 75:201-203). Urea, the most popular nitrogen fertilizer, was often observed to cause leaf burn after foliar fertilization. The application of granular fertilizer also has the potential to cause phytotoxicity leaf burn because leaves of turfgrass are close to the ground and readily contact granular fertilizer.

Bremner (1995, Fertilizer Research 42:321-329) summarized approaches to reduce the phytotoxicity of urea, including (a) addition of an urease inhibitor to fertilizer; (b) coating of the fertilizer with sulfur or other materials to slow its rate of dissolution; (c) acidulation of the fertilizer with inorganic acids; (d) treatment of the fertilizer with inorganic salts; and (e) use of urea supergranules. Some of these approaches can also be used for other nitrogen fertilizers.

Foliar application of calcium supplements is also a typical management practice in many crops and in particular apple and other fruit trees. High doses of calcium also potentially cause phytotoxicity on the tree canopy. However, less attention has been paid to the reduction of calcium phytotoxicity.

Thus there is a need to reduce the phytotoxicity resulting from the foliar application of nitrogen-containing fertilizers or calcium-containing nutrient supplements. A reduction in phytotoxicity would also enable the use of higher fertilizer rates and potentially less frequent applications.

In order maximize the performance of ABA analogs in their various agricultural and horticultural applications; there is a need to improve ABA analog and ABA derivative absorption to reduce water loss and leaf transpiration of plants.

SUMMARY OF INVENTION

The present invention is directed toward the incorporation of an effective amount of an nitrogen and/or calcium containing fertilizer or salt into an ABA analog-containing end-use solution composition or into a liquid or solid formulation composition intended for preparation of such an end-use solution in order to increase the effectiveness of ABA analogs by increasing the extent and/or extending the duration of their desired biological activity. This is then accomplished by applying said end-use solution composition directly to target plants or the locus thereof by spraying or drenching.

The present invention is also directed to the incorporation of an effective amount of a nitrogen and/or calcium containing fertilizer or salt to an ABA analog-containing end-use solution composition in order to decrease the ABA analog application rate required to attain a targeted degree or duration of ABA analog biological activity.

The present invention is also directed to the incorporation of an effective amount of a nitrogen and/or calcium containing fertilizer or salt in an ABA analog-containing in bottle formulation in order to decrease the ABA analog application rate required to attain a targeted degree or duration of ABA analog biological activity.

The present invention relates to the addition of an effective amount of an ABA analog or derivative or their salts to nitrogen and/or calcium containing fertilizers or salts to reduce their phytotoxicity during foliar application. This decrease in phytotoxicity would allow foliar fertilizer application rates to be increased.

DETAILED DESCRIPTION OF THE INVENTION

The compositions of the present invention improve ABA analog effectiveness by incorporating a nitrogen and/or calcium containing fertilizer or salt together with an effective amount of the analog or derivate of the plant growth regulator abscisic acid.

Presently preferred ABA analogs and derivatives include PBI-429, PBI-524, PBI-696 and PBI-702.

For the purposes of this Application, abscisic acid analogs are defined by Structures 1, 2 and 3, wherein for Structure 1:
the bond at the 2-position of the side chain is a cis- or trans-double bond,
the bond at the 4-position of the side chain is a trans-double bond or a triple bond,
the stereochemistry of the alcoholic hydroxyl group is S—, R— or an R,S-mixture,
the stereochemistry of the R1 group is in a cis-relationship to the alcoholic hydroxyl group,
R1=ethynyl, ethenyl, cyclopropyl or trifluoromethyl, and
R2=hydrogen or lower alkyl

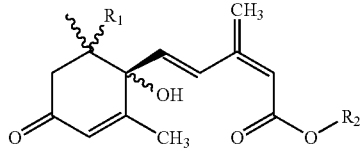

Structure 1 wherein lower alkyl is defined as an alkyl group containing 1 to 4 carbon atoms in a straight or branched chain, which may comprise zero or one ring or double bond when 3 or more carbon atoms are present.

For PBI-429, R1 is ethynyl and R2 is a methyl group.
For PBI-524, R1 is ethynyl and R2 is hydrogen.
For PBI-696, R1 is cyclopropyl and R2 is a methyl group.
For Structure 2:
the bond at the 2-position of the side chain is a cis- or trans-double bond,
the bond at the 4-position of the side chain is a triple bond,
the stereochemistry of the alcoholic hydroxyl group is S—, R— or an R,S-mixture,
R1=hydrogen or lower alkyl

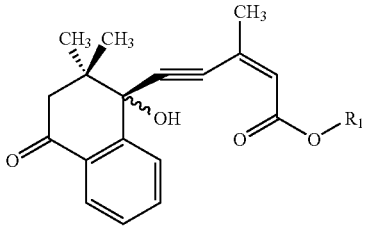

Structure 2 wherein lower alkyl is defined as an alkyl group containing 1 to 4 carbon atoms in a straight or branched chain, which may comprise zero or one ring or double bond when 3 or more carbon atoms are present.

For PBI-702, R1 is a methyl group.
For Structure 3:
the bond at the 2-position of the side chain is a cis- or trans-double bond,
the bond at the 4-position of the side chain is a trans-double bond,
the stereochemistry of the alcoholic hydroxyl group is S—, R— or an R,S-mixture,
R1=hydrogen or lower alkyl

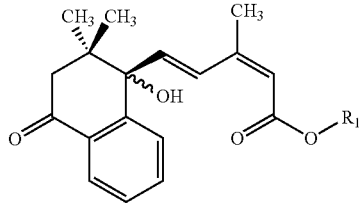

Structure 3 wherein lower alkyl is defined as an alkyl group containing 1 to 4 carbon atoms in a straight or branched chain, which may comprise zero or one ring or double bond when 3 or more carbon atoms are present.

It is also contemplated that salts of the ABA analogs set forth above may be utilized in accordance with the present invention.

As used herein, the term "salt" refers to the water soluble salts of ABA or ABA analogs or derivatives, as appropriate. Representative such salts include inorganic salts such as the ammonium, lithium, sodium, potassium, magnesium and calcium salts and organic amine salts such as the triethanolamine, diethylmethanolamine and ethanolamine salts.

ABA analog effectiveness may be measured experimentally by quantifying the inhibition of transpiration in tomato leaves. This is a reliable laboratory bioassay of the level of ABA activity.

The compositions of the present invention comprise an ABA analog, together with a nitrogen or calcium containing fertilizer or salt, applies to a ready-to-apply formulated liquid solution or to a mixture prepared by the end user of the ABA analog or to a solid or liquid formulation concentrate. The effectiveness of the compositions of the present invention was demonstrated by tomato leaf transpiration inhibition. The response of tomato plants to ABA analogs is representative of the response of other plant species, such as nursery plants, to ABA analogs. Other physiological processes regulated by ABA analogs such as the promotion of drought tolerance of bedding plants, fruit coloration, dormancy of buds and seeds, plant growth control, defoliation, and chilling and freeze stress protection are expected to respond to the combinations of ABA analog with adjuvants of this invention.

Nitrogen-containing fertilizers useful in the present invention include, but are not limited to urea, nitrate salts such as ammonium nitrate, anhydrous ammonium, and ammonium salts such as ammonium sulfate.

Calcium-containing nutrient supplements useful in the present invention include, but are not limited to, calcium salts such as calcium chloride, and calcium nitrate.

Depending on the target plant species, physiological processes of interest, and environmental conditions, the effective concentration of ABA analog can vary, but it is generally in the range of about 0.1 ppm to about 10,000 ppm, and preferably from about 1 to about 100 ppm.

The preferred concentration of nitrogen and/or calcium containing fertilizer or salt in the end-use solutions of the present invention is generally in the range about 0.1 mM to about 1000 mM, preferably from about 1 to about 100 mM. Water is the carrier solvent in the end-use solutions.

The effective concentration range of ABA analog depends on the water volume applied to plants as well as other factors such the plant age and size, the plant species and varietal sensitivity to ABA analog and the targeted physiological process.

The invention is demonstrated by, but is not limited by, the following representative examples.

EXAMPLES

All the research studies were conducted in the greenhouse at the research farm of Valent BioSciences Corporation (Long Grove, Ill.). Tomato (variety: Rutgers) seeds were sown in an 18-cell flat filled with Promix PGX (available from Premier Horticulture Inc. Quakertown, Pa.) for three weeks for germination and initial growth. Plants were then transplanted into pots (18 cm in diameter and 18 cm in height) filled with Promix BX (available from Premier Horticulture Inc. Quakertown, Pa.) and grown for one or two more weeks before treatment, depending on greenhouse temperature. During growing periods, plants received daily irrigation and weekly fertilizer (1 g/L all purpose fertilizer 20-20-20, The Scotts Company, Marysville, Ohio).

Chemical solutions were prepared with distilled water. ABA analogs, 8' acetylene-ABA, acid (PBI-524) and 8' acetylene-ABA methyl ester (PBI-429) were available from Plant Biotechnology Institute, National Research Council of Canada (Saskatoon, Saskatchewan, Canada). Solution of 25 ppm PBI-429 or 25 ppm PBI-524 was prepared by dissolving 25 mg chemical in 1 L distilled water.

Urea and ammonium nitrate ($NH_4NO_3$) were available from Sigma-Aldrich (St. Louis, Mo.).

Calcium chloride ($CaCl_2$) was available from Sigma-Aldrich (St. Louis, Mo.).

Chemical solutions were foliar applied to tomato plant leaves at the rate of 20 mL/6 plants. Plants were then placed in a transparent chamber with humidity controlled at relative humidity 40 to 60%. Leaf transpiration rate was measured 1, 2 and 3 days after treatment using a LI-1600 Steady State Porometer (LI-Cor, Lincoln, Nebr.). The transpiration rate of each treatment was calculated as the percentage of that of control at each day to reduce day-to-day variation caused by changes of environmental condition such as light intensity and temperature.

For phytotoxicity studies, chemical solutions were foliar applied to tomato plant leaves at the rate of 20 mL/6 plants. Plants were then placed in a transparent chamber with humidity controlled at relative humidity 40 to 60%. The number of injured leaves was counted at 5 and 10 days after treatment.

All experiments were randomized complete block experimental design. Data were analyzed by analysis of variance. Duncan's new multiple range tests at $\alpha=0.05$ were used for mean separations.

Example 1

The effect of foliar applied urea or ammonium nitrate at 1, 10 or 100 mM on tomato leaf transpiration was examined (Table 1). Neither urea nor ammonium nitrate at any of three tested concentrations significantly reduced tomato leaf transpiration during the 4-day experimental period.

TABLE 1

Effect of foliar applied urea and its combination with ABA on tomato leaf transpiration inhibition.

| Treatment | Transpiration rate (% of control) Days after treatment | | | |
|---|---|---|---|---|
| | 1 | 2 | 3 | 4 |
| Control | 100 | 100 | 100 | 100 |
| 1 mM Urea | 103 | 98 | 98 | 100 |
| 10 mM Urea | 101 | 103 | 106 | 101 |
| 100 mM Urea | 102 | 102 | 107 | 102 |
| 1 mM $NH_4NO_3$ | 107 | 107 | 106 | 83 |
| 10 mM $NH_4NO_3$ | 95 | 95 | 131 | 106 |
| 100 mM $NH_4NO_3$ | 97 | 97 | 128 | 107 |

Example 2

The effect of urea or ammonium nitrate on improving PBI-429 performance for leaf transpiration inhibition was examined (Table 2). The combination of 1, 10 or 100 mM urea with 25 ppm PBI-429 caused lower transpiration rates than 25 ppm PBI-429 alone. Urea at 1 mM or 10 mM had a similar effect on improving PBI-429 performance for transpiration inhibition based on the 7-day average transpiration rate. Urea at 100 mM had more effect than at 1 mM or 10 mM on improving PBI-429 performance for transpiration inhibition. Ammonium nitrate at 1 mM did not affect PBI-429 performance for transpiration inhibition. Ammonium nitrate at 10 mM improved PBI-429 performance for transpiration inhibition, with more effect at higher ammonium nitrate concentration. Results indicated that the nitrogen-containing fertilizer could be used to improved PBI-429 performance.

TABLE 2

Effect of urea and ammonium nitrate on improving PBI-429 performance for tomato leaf transpiration inhibition.

| Treatment | Transpiration rate (% of control) Days after treatment | | | | | |
|---|---|---|---|---|---|---|
| | 1 | 2 | 3 | 4 | 7 | Average |
| Control | 100 | 100 | 100 | 100 | 100 | 100 |
| 25 ppm PBI-429 | 60 | 42 | 64 | 63 | 87 | 63 |
| 25 ppm PBI-429 + 1 mM Urea | 76 | 29 | 53 | 51 | 84 | 58 |
| 25 ppm PBI-429 + 10 mM Urea | 70 | 34 | 51 | 52 | 83 | 58 |
| 25 ppm PBI-429 + 100 mM Urea | 42 | 33 | 48 | 46 | 80 | 50 |
| 25 ppm PBI-429 + 1 mM NH$_4$NO$_3$ | 88 | 38 | 62 | 62 | 87 | 67 |
| 25 ppm PBI-429 + 10 mM NH$_4$NO$_3$ | 61 | 32 | 44 | 46 | 86 | 54 |
| 25 ppm PBI-429 + 100 mM NH$_4$NO$_3$ | 35 | 30 | 38 | 38 | 82 | 44 |

Example 3

Nutrients (100 mM urea, ammonium nitrate, ammonium sulfate or calcium chloride), ABA analogs (25-ppm PBI-429 or PBI-524), and their combinations were one time foliar applied to tomato plants to examine phytotoxicity (Table 3). Control, 25-ppm PBI-429 or 25-ppm PBI-524 did not show any phytotoxicity during 10-day experimental periods. 100-mM urea, 100-mM ammonium nitrate and 100-mM ammonium sulfate treated plants showed phytotoxicity, beginning 5 days after treatments. The number of injured leaves increased dramatically from 5 days to 10 days after treatment. Calcium chloride caused little phytotoxicity at 5 days after treatment, but caused substantial phytotoxicity at 10 days after treatment. Combining 25-ppm PBI-429 or 25-ppm PBI-524 with urea, ammonium nitrate, ammonium sulfate or calcium chloride significantly reduced the number of injured leaves at 5 or 10 days after treatment.

These results demonstrate that ABA analogs PBI-429 and PBI-524 can be used as safening agents for foliar application of fertilizers such as those containing nitrogen and calcium.

TABLE 3

Effect of two ABA analogs PBI-429 and PBI-524 on reducing the phytotoxicity caused by foliar application of nitrogen fertilizers.

| Treatment | Number of injured leaves Days after treatment | |
|---|---|---|
| | 5 | 10 |
| Control | 0.0 | 0.0 |
| 25 ppm PBI-429 | 0.0 | 0.0 |
| 25 ppm PBI-524 | 0.0 | 0.0 |
| 100 mM Urea | 6.7 | 17.8 |
| 100 mM urea + 25 ppm PBI-429 | 1.0 | 4.5 |
| 100 mM Urea + 25 ppm PBI-524 | 0.3 | 3.8 |
| 100 mM NH$_4$NO$_3$ | 8.2 | 14.8 |
| 100 mM NH$_4$NO$_3$ + 25 ppm PBI-429 | 1.2 | 2.8 |
| 100 mM NH$_4$NO$_3$ + 25 ppm PBI-524 | 0.5 | 2.2 |
| 100 mM (NH$_4$)$_2$SO$_4$ | 3.5 | 10.2 |
| 100 mM (NH$_4$)$_2$SO$_4$ + 25 ppm PBI-429 | 0.3 | 2.2 |
| 100 mM (NH$_4$)$_2$SO$_4$ + 25 ppm PBI-524 | 0.2 | 1.7 |
| 100 mM CaCl$_2$ | 0.2 | 7.0 |
| 100 mM CaCl$_2$ + 25 ppm PBI-429 | 0.0 | 1.2 |
| 100 mM CaCl$_2$ + 25 ppm PBI-524 | 0.0 | 1.2 |

The invention claimed is:

1. An agricultural composition comprising 25 to 100 ppm of at least one abscisic acid analog selected from the group consisting of:
    (a) PBI-429;
    (b) PBI-524; and
    (c) a salt of said abscisic acid analog;
    and 10 to 100 mM of at least one fertilizer containing nitrogen and/or calcium.

2. A method for enhancing and extending the effect of at least one ABA analog or a salt thereof on reducing water loss and leaf transpiration of plants which comprises applying an effective amount of the composition of claim 1 to a plant.

3. The method of claim 1 wherein the fertilizer is urea.

4. The method of claim 1 wherein the fertilizer is ammonium nitrate.

5. A method of reducing the phytotoxicity of a fertilizer containing nitrogen and/or calcium comprising adding 25 to 100 ppm of at least one abscisic acid analog selected from the group consisting of:
    (a) PBI-429;
    (b) PBI-524; and
    (c) a salt of said abscisic acid analog;
    to 10 to 100 mM of at least one fertilizer containing nitrogren and/or calcium before or with application of the fertilizer to a plant susceptible to phytotoxicity.

6. The method of claim 5 wherein the fertilizer is urea.

7. The method of claim 5 wherein the fertilizer is ammonium nitrate.

8. The method of claim 5 wherein the fertilizer is ammonium sulfate.

9. The method of claim 5 wherein the fertilizer is calcium chloride.

10. The composition of claim 1 wherein the fertilizer is urea.

11. The composition of claim 1 wherein the fertilizer is ammonium nitrate.

12. The composition of claim 1 wherein the fertilizer is ammonium sulfate.

13. The composition of claim 1 wherein the fertilizer is calcium chloride.

14. The composition according to claim 1 comprising 25 ppm ABA analog or salt thereof.

15. The composition according to claim 14 comprising 10 to 100 mM of fertilizer.

* * * * *